US010602385B1

(12) United States Patent
Jones (10) Patent No.: US 10,602,385 B1
(45) Date of Patent: Mar. 24, 2020

(54) POSITIONER FOR ANTENNA TESTING

(71) Applicant: T-Mobile USA, Inc., Bellevue, WA (US)

(72) Inventor: David Jones, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/125,576

(22) Filed: Sep. 7, 2018

(51) Int. Cl.
| | |
|---|---|
| *H04W 24/06* | (2009.01) |
| *H04W 64/00* | (2009.01) |
| *H04B 17/27* | (2015.01) |
| *H04W 24/02* | (2009.01) |
| *H04W 24/00* | (2009.01) |
| *H04W 88/02* | (2009.01) |
| *H04W 24/10* | (2009.01) |
| *H04B 10/11* | (2013.01) |

(52) U.S. Cl.
CPC ............ *H04W 24/06* (2013.01); *H04B 17/27* (2015.01); *H04W 24/00* (2013.01); *H04W 24/02* (2013.01); *H04W 64/006* (2013.01); *H04B 10/11* (2013.01); *H04W 24/10* (2013.01); *H04W 88/02* (2013.01)

(58) Field of Classification Search
CPC ... H04W 24/06; H04W 64/006; H04W 24/00; H04W 24/02; H04W 24/04; H04W 64/00; H04W 88/02; H04W 88/00; H04W 24/08; H04W 24/10; H04W 72/085; H04W 72/1231; H04W 76/10; H04W 76/15; H04W 56/0035; H04W 56/00; H04B 17/27; H04B 17/15; H04B 17/16; H04B 17/20; H04B 17/29; H04B 17/309; H04B 17/318; H04B 1/3877; H04B 10/07; H04B 10/11; H04B 17/00; H04B 17/11; H04B 17/17; H04B 17/21; H04B 27/17; B81C 99/0035; B81C 99/0045; B81C 99/005; G01S 1/40; G01S 19/23; G01R 29/0821; G01R 29/105; H01Q 3/267
See application file for complete search history.

(56) References Cited

U.S. PATENT DOCUMENTS

| | | | | |
|---|---|---|---|---|
| 9,912,418 | B2 * | 3/2018 | Foegelle | H04B 17/0087 |
| 2018/0048398 | A1 * | 2/2018 | El-Hassan | H04B 17/101 |
| 2018/0340967 | A1 * | 11/2018 | Rowell et al. | G01R 29/10 |
| 2018/0340968 | A1 * | 11/2018 | Abadie | G01R 29/10 |
| 2019/0004102 | A1 * | 1/2019 | Gienger | G01R 29/105 |
| 2019/0162780 | A1 * | 5/2019 | Danz | G01R 31/3025 |
| 2019/0187199 | A1 * | 6/2019 | Mellein | G01R 29/10 |
| 2019/0335346 | A1 * | 10/2019 | Abadie | H04W 24/06 |

* cited by examiner

*Primary Examiner* — Meless N Zewdu
(74) *Attorney, Agent, or Firm* — Han Santos, PLLC (57) ABSTRACT

An antenna test positioner is disclosed that supports a transmission antenna and moves the antenna between two or more positions relative to a stationary electronic device. The antenna test positioner moves the antenna in a linear motion along one or more axes and/or in a rotational motion about one or more axes. The stationary electronic device receives radio signal transmissions from the antenna as the antenna moves between positions. The effect of the movement of the antenna on reception of the radio waves by the electronic device can be measured. This simulates testing that normally requires an electronic device to be moved relative to an antenna, which can induce errors that reduce accuracy.

20 Claims, 6 Drawing Sheets

BASIC CONFIGURATION

POSITIONER FOR ANTENNA TESTING

BACKGROUND

Over time, cellular technologies have improved significantly. A new generation of cellular standards has appeared approximately every tenth year since first generation (1G) systems were introduced in the early eighties. Each generation is characterized by new frequency bands, higher data rates and non-backward-compatible transmission technology. 2G and 2.5G networks supplanted 1G networks, and were eventually replaced by 3G technology. 4G succeeded 3G, but will soon be joined by 5G networks and devices, work on which began in 2016. 5G networks will now include operation at 20-100 GHz frequencies in what are commonly known as the millimeter wave (mmW) band of spectrum, so that 5G networks will now operate at wave frequencies between 600 MHz and 100 GHz. Radio waves in the mmW band have wavelengths from one to ten millimeters, which is much shorter than wavelengths utilized in previous generations.

New challenges come with a transition to mmW technology, as at mmW frequencies, signal absorption rates are much higher due to the higher frequencies' vulnerability to buildings, foliage, automobiles, people, gases, rain, etc. As a result, mmWaves can only transmit for short distances. To compensate, directional transmission/reception ("beamforming") is utilized to boost gain. Beamforming identifies the most efficient data delivery route to a device and reduces interference for nearby devices. Beamforming requires that cellular transmitters and receivers be optimized for many characteristics, among them beam switching, which is required as a mobile cellular device moves in and out of distinct radio beams. Testing setups are needed for beam characterization and for checking beam acquisition, beam tracking, and beam switching performance.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

Techniques for positioning antennae relative to one or more devices (i.e., user equipment) for testing purposes are disclosed herein. Beamforming and other mmWave applications create test challenges, as engineers must conduct static tests on user equipment (UE) in active beam forming environments. Currently, engineers verify transceiver performance by conducting a series of tests, including tests for power and sensitivity. But setting up equipment for such tests can be problematic. One problem is that 5G devices have a significantly higher antenna density, or count, than their 4G predecessors. Implementing measurement connectors for individual antennae can be tedious and problematic in testing procedures that require a Device Under Test (DUT) to be moved to varying locations. In at least some instances, such connected tests may be impossible, thus requiring only over-the-air (OTA) tests.

OTA testing entails several different challenges including repeatability, configuration, and coverage. OTA testing in a real-world environment lacks repeatability due to changes in density of automobiles, people, weather conditions, etc. Real-world OTA testing is also difficult because DUT testing configurations may be difficult to move from one location to another to test beam direction, beam switching, etc.

The techniques disclosed herein describe a laboratory testing environment that includes an antenna (i.e. a transmitter) positioner that can be configured to move an antenna or antenna array to various positions and/or locations. In the described techniques, a device under test does not have to be moved, as the antennae sending signals to the DUT moves around the DUT. This simulates user equipment movement in a real-world environment, while allowing for accuracy and repeatability. Such an arrangement is relatively simple to measure. For example, if a tester knows that moving a beam ten degrees in relation to a device under test should show a move from beam X to beam Y, then that test can easily be set up. In addition, materials may be introduced between a DUT and transmitting antennae in a lab environment to test absorption rates. Such materials may include building materials such as concrete, gypsum drywall, wood, metal, etc. Weather conditions may also be implemented in at least one implementation.

As described herein, the techniques involve a controller to provide power to the antennae, the antenna positioner, and the DUT (directly and/or to a testing platform). The controller can also be configured to receive UE characteristics from the DUT. In at least one implementation, the controller is configured to receive test scripts that control power and position to the antennae setup and move the antennae from configuration to configuration as directed by a test script, thus relieving a user of having to reposition the antennae setup after each test segment. Use of test scripts also makes a battery of tests easily repeatable, either under similar or different conditions. In at least one implementation, the controller doesn't have to be connected to a DUT, which may record reception characteristics on its own or in conjunction with another device. In such instances, the controller will only need to provide power to the antennae and antenna position for the test. In other words, the testing inputs may be administered distinctly from the testing output, which may be collected and analyzed by a different device.

Example Basic Testing Environment

Figure 1:
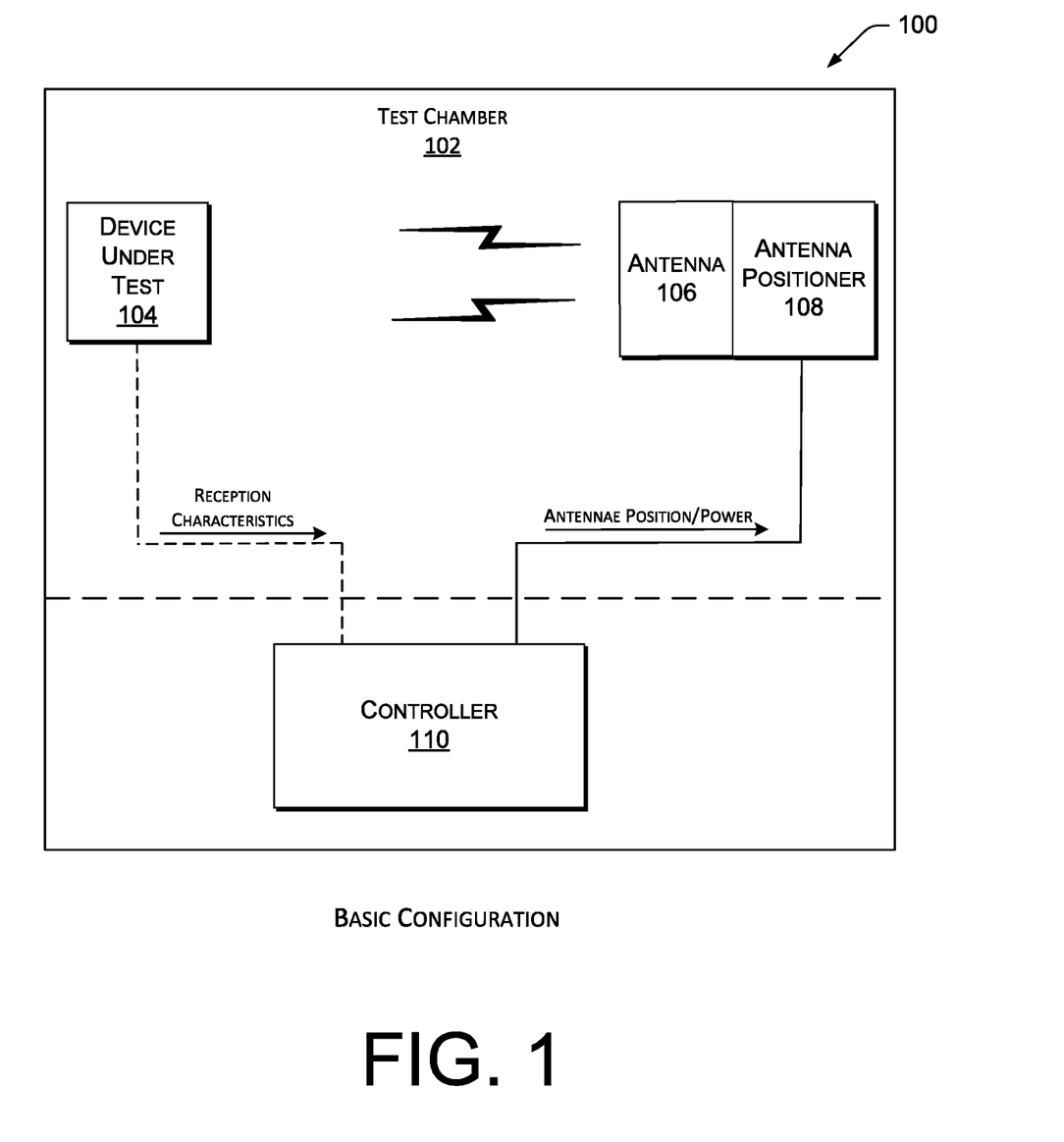
FIG. 1 is a diagram of an example basic testing environment in accordance with the technologies described herein.

FIG. 1 is a diagram of an example basic testing environment 100 in accordance with the technologies described herein. Other, more detailed, configurations are described below. However, each configuration can be illustrated at a high level with reference to FIG. 1.

The example basic testing environment 100 includes a test chamber 102 that is suitable for testing cellular devices and cellular antenna arrays, whether they are receivers, transmitters, or transceivers. The testing chamber 102 can be an anechoic chamber that is designed to completely absorb reflections from surroundings, which allows signals generated in the test chamber 102 to be tested without interference from external signals. Such a configuration can increase testing accuracy. However, other configurations may utilize a non-anechoic chamber, which would allow testing to be accomplished in a noisy environment if measurement in such an environment is desired.

Inside the test chamber 102 is situated a device under test 104 and an antenna 106. The device under test 104 and the antenna 106, in one or more configurations, include cellular transmission and reception technology, such as a cell phone and a cellular signal transmitter. The antenna may comprise a single antennae, multiple antennae, an array of antennae, a phased antenna array, or the like. The example basic testing environment 100 is configured to measure signals transmitted between the antenna 106 and the device under test 104. While the device under test 104 and the antenna 106 may be situated any practical distance apart, they will typically be separated by approximately 1 (one) meter to approximately 10 (ten) meters. As will be shown and described below, physical materials may be introduced in the space between the device under test 104 and the antenna 106 to measure how a material may affect signals transmitted from the antenna 106 and received by the device under test.

The antenna 106 is mounted to, or otherwise controllable by, an antenna positioner 108. The antenna positioner 108 is configured to change a beam direction from the antenna 106 by altering a physical position of the antenna 106. The antenna positioner 108 can change a position of the antenna 106 linearly or rotationally relative to one or more axes (x-axis, y-axis, z-axis). Although not shown here, the antenna positioner 108 can change a position of the antenna 106 relative to the device under test 104 along an orbital rotation, which moves the antenna along an arc relative to the device under test 104. Further details related to the antenna positioner 108 are shown and described below, with respect to subsequent figures.

The example basic testing environment 100 also includes a controller 110 that is configured to control at least a position of the antenna positioner 108 and power to the antenna 106 and antenna positioner 108. The controller 110 can also be configured to receive transmission reception data from the device under test 104 in some scenarios. The controller 110 may or may not be co-located within the test chamber 102 with the device under test 104, the antenna 106, and the antenna positioner 108. In fact, it may be desirable for the controller 110 to be located outside of the test chamber 102 to reduce interference from the controller 110 itself or from humans operating the controller 110. However, in some instances it may be desirable to include the controller 110 in the test chamber 102. The controller 110 is operably connected to the antenna 106 and the antenna positioner 108, to provide and control at least power to the antenna 106 and the antenna positioner 108 and input to the antenna positioner 108 that controls the movement of the antenna positioner 108. In some implementations, the controller 110 may also be operably connected to the device under test 104, to receive and analyze signal reception by the device under test 104. In some cases, the controller 110 may also be configured to change a position of the device under test 104.

Example Device with 3-Axis Rotational Movement

Figure 2:
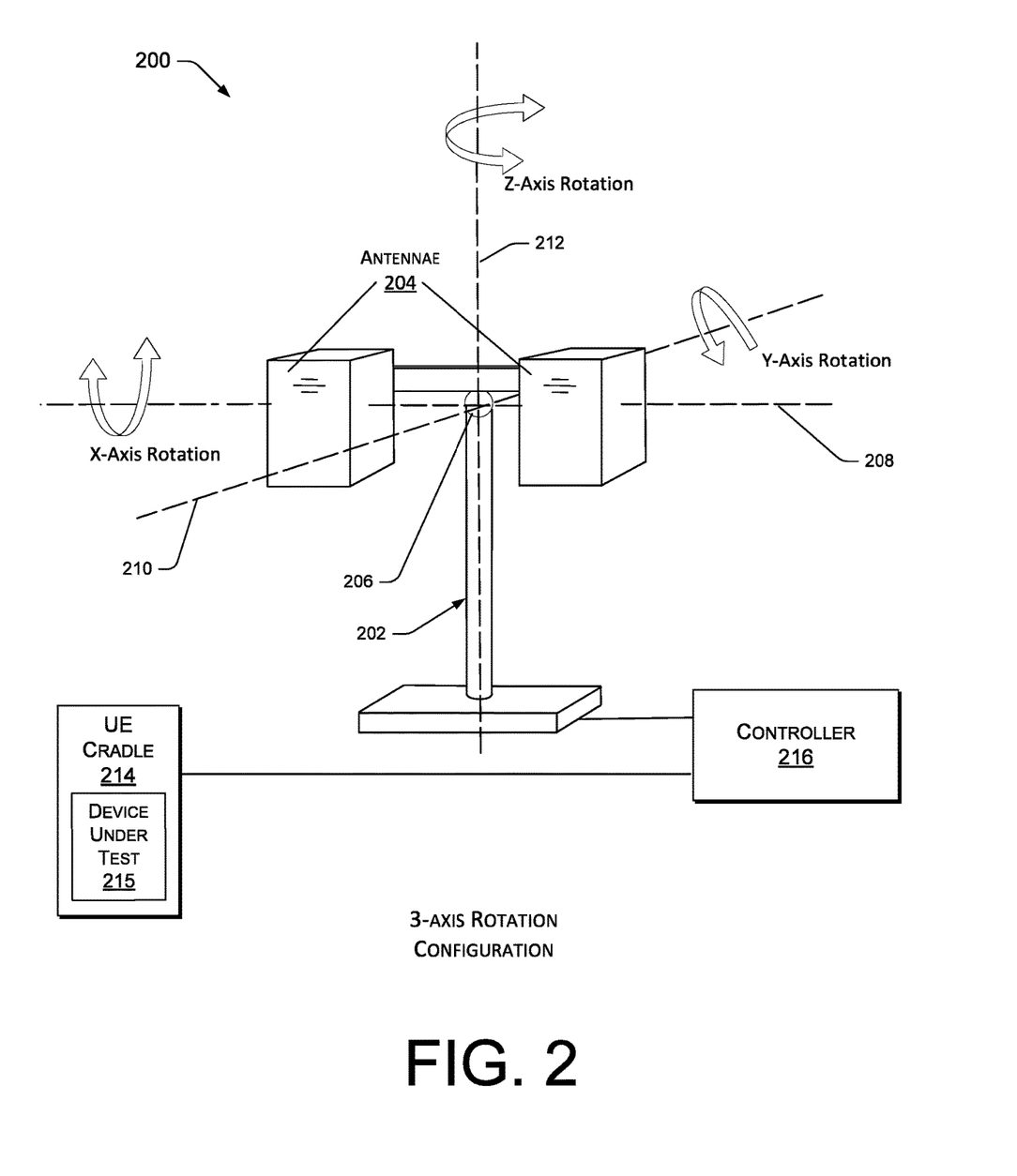
FIG. 2 is a diagram of an example testing system that depicts an antenna positioner having 3-axis rotational movement.

FIG. 2 is a diagram of an example testing system 200 that depicts an antenna positioner having 3-axis rotational movement in accordance with the technologies described herein.

In the following discussion, certain interactions may be attributed to particular components. It is noted that in at least one alternative implementation not particularly described herein, other component interactions and communications may be provided. The following discussion of FIG. 2 merely represents a subset of possible implementations. Furthermore, certain properties attributed to a particular component in the present description may be performed by one or more other components in an alternate implementation. An alternate attribution of properties, or functions, within the example testing system 200 is not intended to limit the scope of the techniques described herein or the claims appended hereto.

The example testing system 200 includes an antenna positioner 202 that supports one or more transmitter antennae 204 by any suitable attachment means. The transmitter antennae 204 may be any kind of electronic device that emits radio signals for any purpose. In the present example, the transmitter antennae 204 transmit cellular communication signals. More particularly, the transmitter antennae 204 transmit 5G cellular signals. The antenna positioner 202 is configured to support the one or more transmitter antennae 204 in such a way that the transmitter antennae 204 may be configured to direct transmissions in a particular direction. The antenna positioner 202 includes a gimbal servo mechanism 206 that can re-position the transmitter antennae 204 about an x-Axis 208, a y-Axis 210, and/or a z-Axis 212. In other implementations, the antenna positioner 202 can be configured to move linearly along one or more axes, to rotate about only one or more axes, or to move in a combination of linear or rotational directions.

The example testing system 200 also includes a user equipment (UE) cradle 214 and a controller 216. The UE cradle 214 is configured to support user equipment (i.e., device under test 215) such as one or more cellular telephones. The UE cradle 214 may be in a fixed position or it may be moveable to multiple positions. The UE cradle 214 may provide connections to a controller that allow the device under test 215 situated in the UE cradle 214 to provide signal reception data to the controller 216 or other electronic devices. The UE cradle 214 provides a mechanism by which the device under test 215 may be placed in a fixed position (at least relative to the UE cradle 214) which decreases movement to the device under test 215, which can increase accuracy of tests. The UE cradle 214 may be as simple as a stationary stand or, in one or more alternate implementations, the UE cradle 214 may be configured to move to different positions, but without changing the co-positioning of the UE cradle 214 with respect to the device under test 215. In at least one implementation, the example testing system 200 may be implemented without the UE cradle 214.

The controller 216 is configured to provide electronic signals to the antenna positioner 202 to at least provide inputs to adjust characteristics of transmitter antennae 204 (e.g., antennae power, etc.) and to specify a desired position of the antenna positioner 202. As described in greater detail, below, the controller 216 can also be configured to execute scripts that enable running continuous tests that vary characteristics of antennae 204 and the position of antenna positioner 202. In a typical testing scenario, the device under test 215 is placed in the UE cradle 214 and the controller 216 is used to set certain characteristics of transmitter antennae 204, such as beam power, frequency, etc. The controller 216 is also used to control changes in the position of the antenna positioner 202. As the antenna positioner 202 moves along a prescribed path, the transmitter antennae 204 emit cellular signals that are picked up by the device under test 215 in the UE cradle 214. The controller may also receive data regarding signal reception from the device under test 215 in the UE cradle 214.

Example Testing System with 3-Axis Linear and Rotational Movement

Figure 3A:
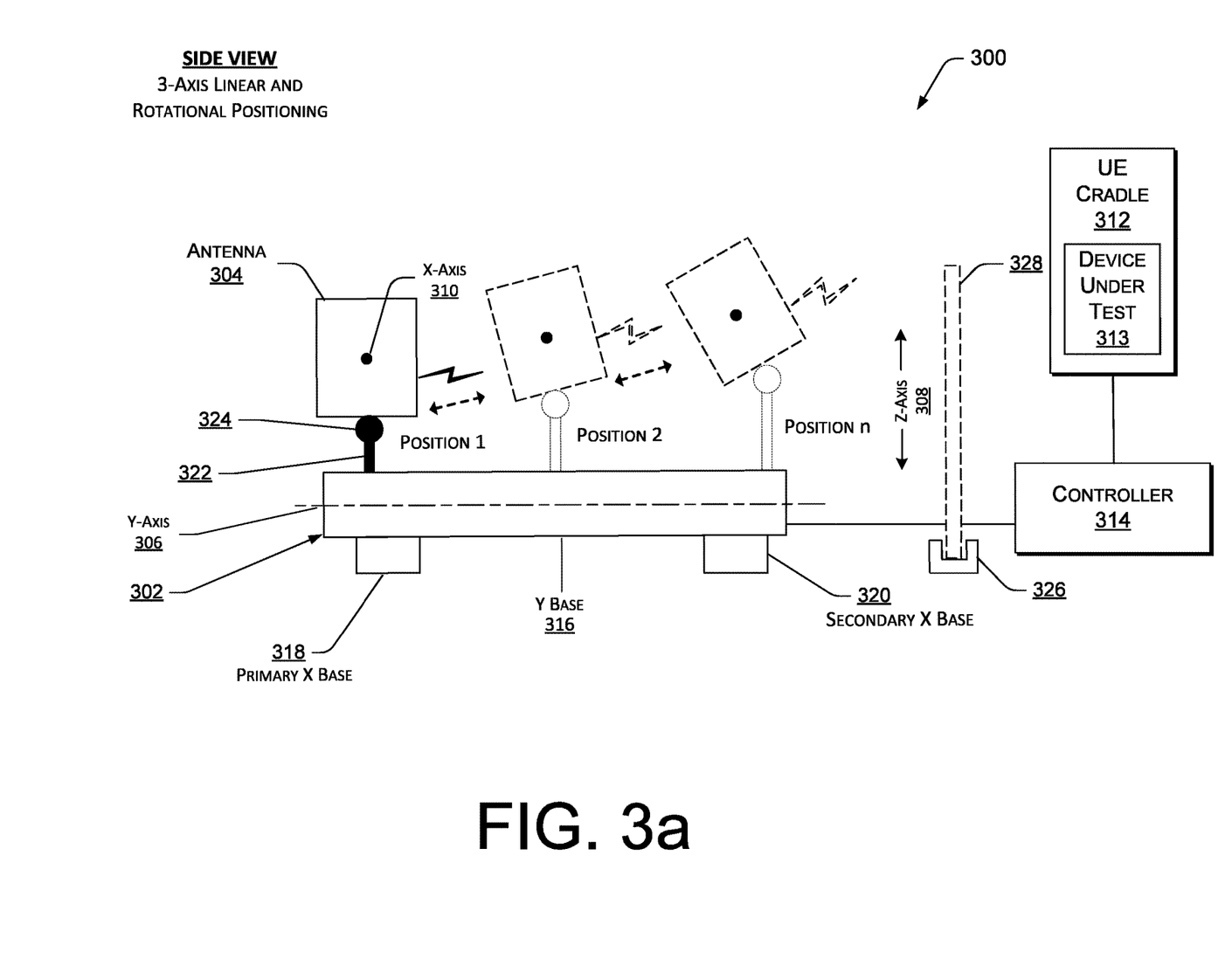
FIG. 3a is a front view of an example testing system that depicts an antenna positioner having a 6-axis (liner+rotational) movement.
Figure 3B:
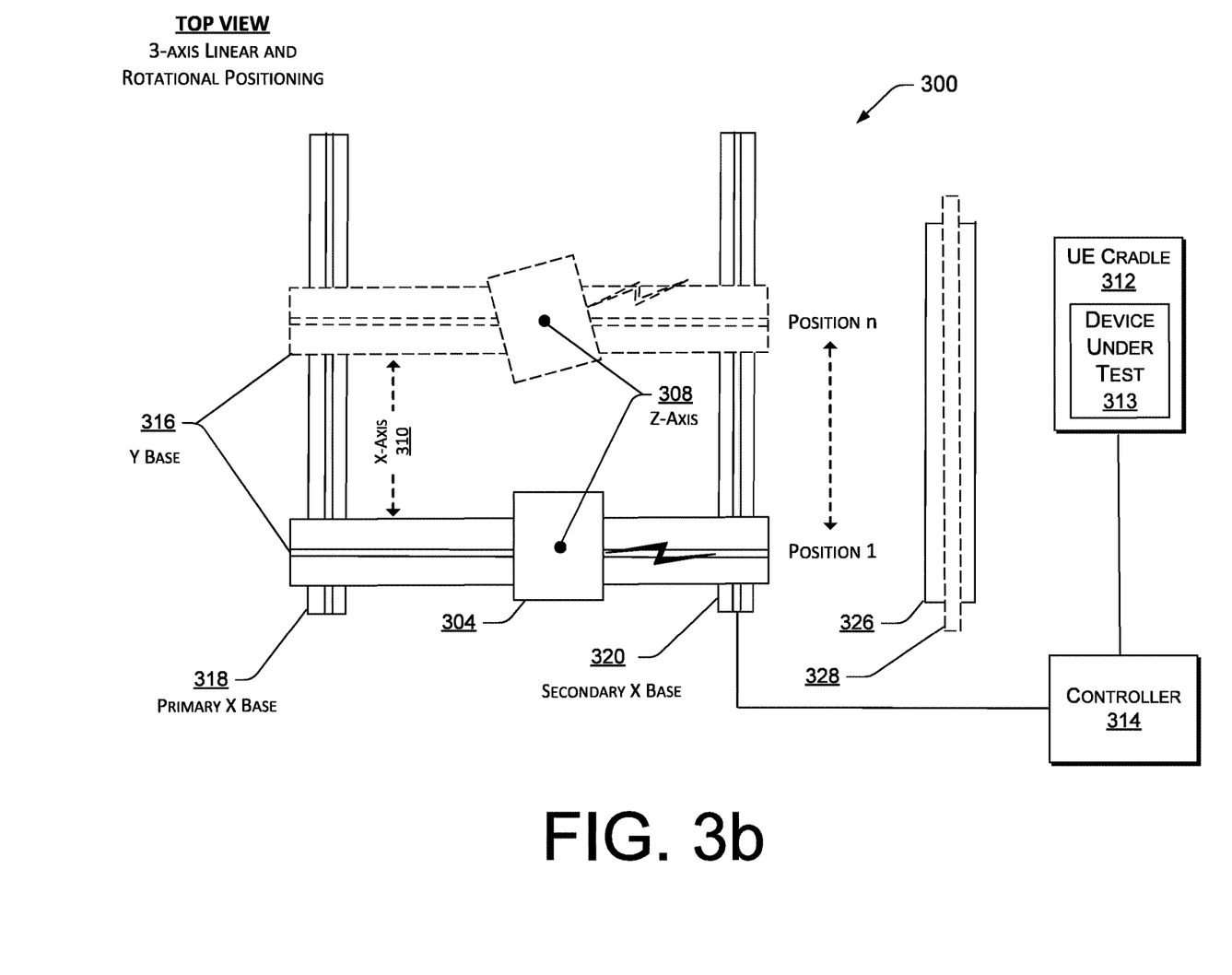
FIG. 3b is a diagram of a side view of the example testing system shown in FIG. 3.

FIG. 3a and FIG. 3b depict an example testing system 300 that includes an example antenna positioner 302 capable of moving one or more antennae 304 linearly and rotationally with respect to three axes (x, y, z). FIG. 3a depicts a side view of the example antenna positioner 302 and antenna 304 linear movement along a y-axis 306 and a z-axis 308, with rotation about an x-axis 310. FIG. 3b depicts a side view of the example antenna positioner 302 and antenna 304 linear movement along the x-axis 310 with rotation about the z-axis 308. The example testing system 300 also includes a user equipment (UE) cradle 312 supporting a device under test (DUT) 313 and a controller 314.

The example antenna positioner 302 includes a Y base 316 that aligns with the y-axis 306. The Y base 316 is mounted atop of a primary X base 318 and a secondary X base 320, and the Y base moves linearly along the x-axis 310 by moving across the primary X base 318 and the secondary X base 320. The example antenna positioner 302 also includes an extendable mast 322 that supports the antenna 304 and can extend to move the antenna 304 linearly along the z-axis 308. The Y base 316 is moveable along the primary X base 318 and the secondary X base 320 which, in effect, moves the mast 322 and the antenna 304 along the x-axis 306. A gimbal servo mechanism 324 is mounted atop the mast 322 and the antenna 304 is mounted to the gimbal servo mechanism 324. The gimbal servo mechanism 324 can rotate to change a position of the antenna 304. Rotation of the gimbal servo mechanism 324 can be performed about the x-axis 310 to move the antenna 304 in an up and/or down direction. The gimbal servo mechanism 324 can also be rotated about the y-axis 306 to tilt the antenna 304 left or right, and/or about the z-axis 308 to move a direction of the antenna 304 from left to right.

FIG. 3a depicts a situation in which a position of the antenna 304 is moved from a first position ("Position 1") to a second position ("Position 2") and to a final position ("Position n"). From Position 1, the mast 322, the gimbal servo mechanism 324, and the antenna 304 move linearly along the y-axis 306 to Position 2. Approximately contemporaneously, the gimbal servo mechanism 324 rotates about the z-axis 308. This rotation may be simultaneous with the linear movement or it can be performed immediately preceding or following the linear movement. As the antenna 304 changes positions, the directional beam of the antenna 304 and the distance between the antenna 304 and the DUT 313. The effects of such changes on reception by the device under test 313 can thus be measured. Contemporaneously, other characteristics of the antenna 304, such as beam power, can be altered via the controller 314 as well. Results of an effect of changes on DUT 215 reception can be measured and compared to expectations.

The example testing system 300 is also shown including an obstacle mount 326 that is configured to support an obstacle 328 situated between the antenna 304 and the DUT 313 to test the effects of different types of obstacles 328. For example, the obstacle 328 may include common building materials such as a wood product, glass, metal, drywall, concrete, stone, etc. The obstacle 328 may also include naturally-occurring materials, such as foliage, etc. Placing the obstacle 328 in the line of sight between the antenna 304 and the DUT 313 allow devices to be tested for real-world environmental conditions to ensure that the DUT 313 operates as expected in common usage scenarios.

FIG. 3b shows a top view of the example testing system 300 and depicts another movement scenario wherein the antenna 304 moves in a linear direction along the x-axis 310. To accomplish this, the Y base 316 moves linearly atop the primary X base 318 and the secondary X base 320 from an initial position ("Position 1") to a final position ("Position n"). Contemporaneously therewith, the gimbal servo mechanism 324 rotates the antenna 304 about the z-axis 308 to effect a different direction of waves from the antenna 304. This scenario is only an example, and only one form of movement is necessary to implement the present techniques. However, the present scenario depicts two ways that output from the antenna 304 can be re-directed.

Example Methodological Implementation

Figure 4:
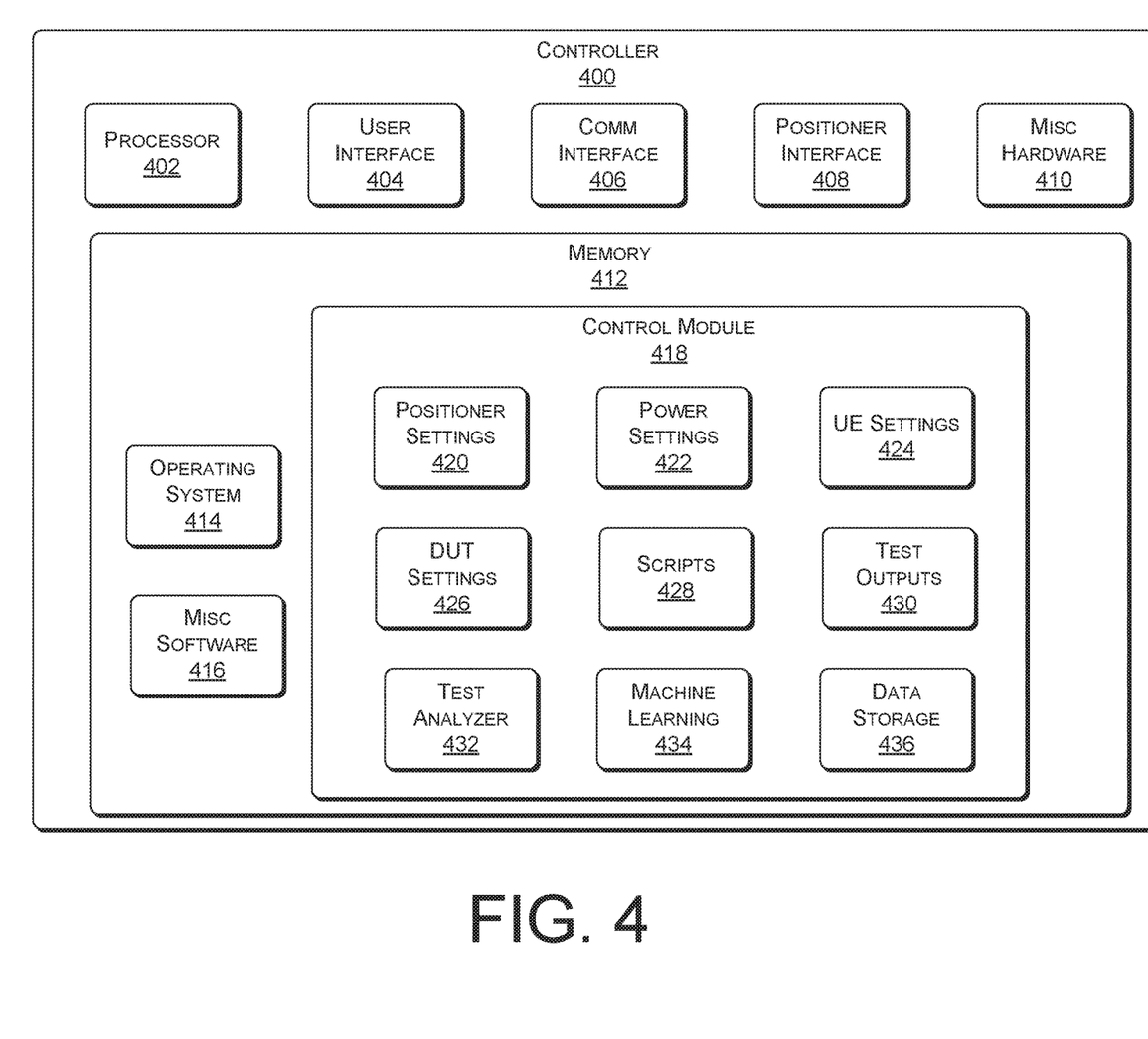
FIG. 4 is a block diagram of an example antenna test controller in accordance with the technologies described herein.

FIG. 4 is a block diagram of an example antenna test controller 400 in accordance with the technologies described herein. In the following discussion, certain interactions may be attributed to particular components. It is noted that in at least one alternative implementation not particularly described herein, other component interactions and communications may be provided. The following discussion of FIG. 4 merely represents a subset of all possible implementations. Furthermore, although other implementations may differ, one or more elements of the example antenna test controller 400 are described as a software application that includes, and has components that include, code segments of processor-executable instructions. As such, certain properties attributed to a particular component in the present description may be performed by one or more other components in an alternate implementation. An alternate attribution of properties, or functions, within the example antenna test controller 400 is not intended to limit the scope of the techniques described herein or the claims appended hereto.

The example antenna test controller 400 includes one or more processors 402 that process computer-executable instructions. Each of the one or more processors 402 may be a single-core processor or a multi-core processor. The controller 400 also includes user interfaces 404, one or more communication interfaces 406, and a positioner interface 408. The user interfaces 404 provide hardware components that provide an interface between a user and the controller 400. The user interfaces 404 can include a display monitor, knobs, dials, readouts, printers, keyboards, styluses, etc.

The communication interface 406 facilitates communication with components located outside the example antenna test controller 400 and provides networking capabilities for the example controller 400. For example, the controller 400, by way of the communications interface 406, may exchange data with other electronic devices (e.g., laptops, computers, etc.) via one or more networks, such as a private network, the Internet, etc. Communications between the example controller 400 and other electronic devices may utilize any sort of communication protocol known in the art for sending and receiving data and/or voice communications.

The positioner interface 408 provides a connection between the controller 400 and the antenna positioner 302 (FIG. 3). The positioner interface 408 works with one or more of the user interfaces 404 to allow a user to control certain aspects of the antenna positioner 302 (FIG. 3) and the antenna 304 (FIG. 3). For example, a user can set an antenna power level via the user interface 404, and the data is transmitted via the positioner interface 408. Similarly, a user can set an antenna positioner direction and/or movement through the user interfaces 404, and the antenna positioner 302 will be moved to the instructed position(s) through signals received via the positioner interface 408.

The example antenna test controller 400 also includes miscellaneous hardware 410. The miscellaneous hardware 410 includes hardware components and associated software and/or or firmware used to carry out device operations. Included in the miscellaneous hardware 410 are one or more user interface hardware components not shown individually—such as a keyboard, a mouse, a display, a microphone, a camera, and/or the like—that support user interaction with the example controller 400.

The example antenna test controller 400 also includes memory 412 that stores data, executable instructions, modules, components, data structures, etc. The memory 412 can be implemented using computer-readable media. Computer-readable media includes at least two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer storage media may also be referred to as "non-transitory" media. Although in theory, all storage media are transitory, the term "non-transitory" is used to contrast storage media from communication media, and refers to a tangible component that can store computer-executable programs, applications, instructions, etc. In contrast, communication media may embody computer-readable instructions, data structures, program modules, or other data in a modulated data signal, such as a carrier wave, or other transmission mechanism. Communication media may also be referred to as "transitory" media, in which electronic data may only be stored in a non-tangible form.

An operating system 414 is stored in the memory 412 of the example controller 400. The operating system 414 controls functionality of the processor 402, the communications interfaces 404, the communication interfaces 406, the positioner interface 408, the miscellaneous hardware 410, and memory operations. Furthermore, the operating system 414 includes components that enable the example controller 400 to receive and transmit data via various inputs (e.g., user controls, network interfaces, and/or memory devices), as well as process data using the processor 402 to generate output. The operating system 414 can include a presentation component that controls presentation of output (e.g., display the data on an electronic display, store the data in memory, transmit the data to another electronic device, etc.). Additionally, the operating system 414 can include other components that perform various additional functions generally associated with a typical operating system. The memory 412 also stores miscellaneous software applications 416, or programs, that provide or support functionality for the example controller 400, or provide a general or specialized device user function that may or may not be related to the example controller 400 per se. The software applications 416 can include system software applications and executable applications that carry out non-system functions.

A control module 418 is stored in the memory 412 and controls settings for the antenna positioner 302 and the antenna 304 via the user interfaces 404 the communication interface 406 and the positioner interface 408. Components of control module 418 cooperate with the operating system 414 and/or the miscellaneous software 416 to carry out particular functionality of the example controller 400. Specific components of the control module 418 are described below. Although the components are shown implemented in software, one or more of the components shown may be implemented in hardware or firmware. As such, certain functionality ascribed to a particular component may be implemented in a different component. Furthermore, additionally functionality or less functionality than described herein may be implemented.

The control module 418 includes positioner settings 420 that store settings input by a user via the user interfaces 404 to set a position of the antenna positioner 302, such as coordinates to position the mast 322 on the Y base 316 or the Y base 316 on the primary X base 318 and the secondary X base 320. The positioner settings 420 are also used to set a position of the gimbal servo mechanism 324 to set a direction of the antenna 304. The control module 418 also includes power settings 422 that include user inputs for antenna power and other antenna characteristics. The ability for a user to input settings for the antenna positioner 302 and the antenna 304 from a single device that controls the testing system provides for easier operation by a user and greater reliability.

The control module 418 also includes user interface settings 424 that include user input settings from the user interfaces 404. The control module 418 further includes DUT settings 426 that are input by a user via the user interfaces 404. The UE cradle settings 426 control settings for the UE cradle 312 and the device under test 313 in the UE cradle 312. For example, if the UE cradle 312 is positionable, the UE cradle settings 426 include position data for the UE cradle 312. The UE cradle settings 426 may also be used to store settings data for the device under test 313 if such settings are necessary. Typically, however, the device under test 313 may simply be set in a normal receiving mode and no dynamic setting is necessary.

In one operational mode, a user enters settings for the antenna positioner 302 and the antenna 304 and executes a test with those settings. Then, new settings can be entered to run another test with different settings. The process can be repeated as many times as desired. As an added efficiency, multiple test settings can be organized in a test script. The control module 418 includes scripts 428 that are input by a user and are used to control multi-part tests. Test outputs 430 are stored in the control module 418 and a test analyzer 432 is used to correlate test results with expected results and to otherwise measure success or failure of a particular test or set of tests. A machine learning module 434 may also be included in the control module 418. The machine learning module 434 is configured to search for patterns in test results that indicate tests that may be repeated, or to identify tests with new parameters to focus on a detected problem. The control module 418 also includes data storage 436 that stores a variety of collected data including, but not limited to, test inputs, test outputs, test conditions, test date, test time, etc.

Example Methodological Implementation

Figure 5:
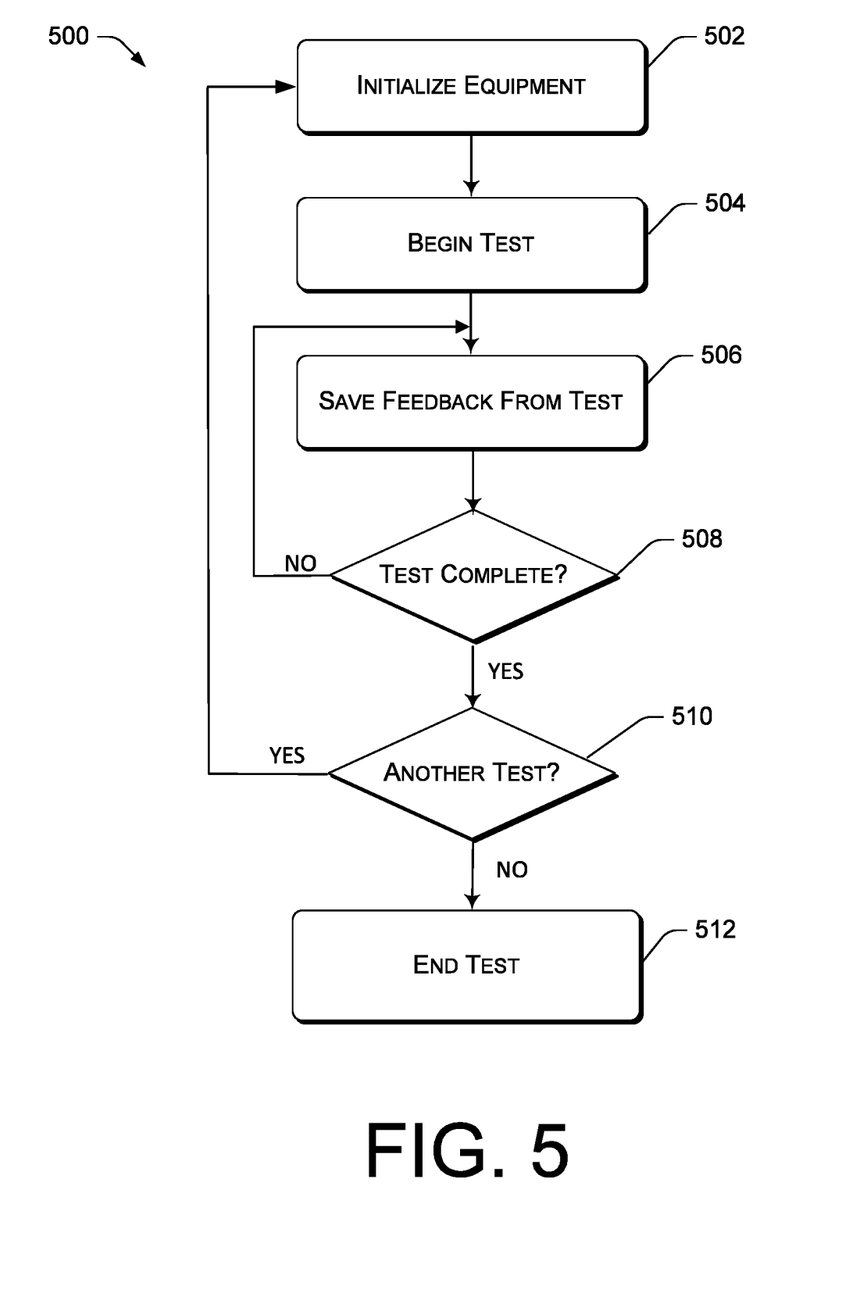
FIG. 5 is a flow diagram of an example antenna testing method in accordance with the technologies described herein.

FIG. 5 is a flow diagram 500 of an example methodological implementation for using an antenna test positioner 302 (FIG. 3) to test a user device according to one or more implementations described herein, and as described with regard to the example test system 300 shown in FIG. 3a and FIG. 3b. In the following discussion, certain operations may be attributed to one or more particular elements of a test system such as the example test system 300. However, it is noted that any operations described below may be accomplished, in whole or partially, by one or more other elements in the example test system 300. In the following discussion, continuing reference may be made to one or more previous figures and reference numerals contained therein.

At block 502, a user initializes equipment to set up a test scenario. For example, the user sets up the device under test 313 on the UE cradle 312 and makes any connections that may be required between the controller 314, the UE cradle 312, the device under test 313, and/or the antenna positioner 302. The user also initializes settings via the controller 314 for the antenna 304 and the antenna positioner 302 to values that will be utilized during the test. For example, a power level for the antenna 304 may be set to a desired level. Also, an initial position of the antenna positioner 302 is set. The antenna positioner 302 may be moved to the desired position prior to beginning the test. A second position of the antenna positioner 302 may also be set at this time. During the test, the antenna positioner 302 may travel from the initial position to the second position while reception data for the device under test 313 is collected. Furthermore, additional positions for the antenna positioner 302 may be entered.

Configurable settings for the antenna positioner 302 include points, or coordinates, along the x-axis 310, the y-axis 306, and/or the z-axis 308. Rotation angles of the antenna 304 may also be entered, whereby the antenna positioner 302 actuates the gimbal servo mechanism 324 to rotate the antenna about the x-axis 310, the y-axis 306, and/or the z-axis 308. Said rotation may be unidirectional, from a first position to a second position, or bidirectional, wherein the antenna 304 is rotated from a first position to a second position and back to the first position. The bidirectional movement may occur a single time or it may occur multiple times.

At block 504, a test begins and radio waves are transmitted from the antenna 304. The device under test 313 picks up some of the transmitted radio waves and feedback is saved in data storage 436 at block 506. The feedback includes at least data related to the position of the antenna 304 at particular times, a power level of the antenna 304 at the corresponding particular times, and a reception level at the device under test 313 at the corresponding particular times. Data related to a date and time the reception level is taken may also be saved. As long as the test is not complete ("No" branch, block 508), the antenna positioner 302 is repositioned to change a direction of transmission from the antenna 304 and reception levels at the device under test 313 are recorded (block 506).

When the test is complete ("Yes" branch, block 508) and if there is another test to perform ("Yes" branch, block 510), then the process reverts to block 502 where the equipment is initialized. This may result from a user inputting new parameters for a test, or it may be a result of the execution of a script that includes several tests to be performed in a series of tests. The equipment initialization (block 502) may entail repositioning the antenna positioner 302 to a starting position for the new test. The process then continues to perform the test and save results. If there is not another test to perform ("No" branch, block 510), then the process ends at block 512.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
an antenna;
an antenna test positioner configured to support the antenna and to move from a first position to a second position to change an orientation of radio waves emitted from the antenna; and
a controller configured to:
receive user input designating the first position and the second position,
cause the antenna test positioner to move from the first position to the second position,
measure movement of the antenna test positioner from the first position to the second position,
measure reception of the radio waves by a stationary electronic device, and
determine whether the movement affects reception of the radio waves by the stationary electronic device and, if so, determine a magnitude of change in the reception of the radio waves.

2. The system as recited in claim 1, further comprising a user equipment cradle configured to secure the stationary electronic device in a fixed position.

3. The system as recited in claim 1, wherein the controller is further configured to measure radio wave reception by the stationary electronic device.

4. The system as recited in claim 1, wherein the controller is further configured to accept test scripts that define a series of tests to be performed using the antenna positioner and the antenna.

5. The system as recited in claim 1, wherein the antenna is configured to emit 5G cellular signals.

6. The system as recited in claim 1, further comprising an obstacle support to support an obstacle between the antenna and the electronic device.

7. The system as recited in claim 1, wherein:
the antenna positioner comprises a moveable base movably mounted to a stationary base;
the antenna is mounted to the antenna positioner; and
the controller is configured to control movement of the moveable base on the stationary base to move the antenna along two linear axes.

8. The system as recited in claim 1, wherein the antenna positioner is configured to move the antenna rotationally about at least one axis.

9. The system as recited in claim 1, wherein the antenna positioner is configured to move the antenna linearly along at least one axis and rotationally about at least one axis.

10. A method, comprising:
designating a first position relative to an electronic device;
initializing an antenna positioner that supports at least one antenna at the designated first position, the antenna being configured to transmit radio waves;
initializing transmission characteristics of the antenna;
designating a second position relative to the electronic device;
moving the antenna positioner to the designated second position; and
measuring reception of the radio waves by the electronic device as the antenna positioner moves from the designated first position to the designated second position.

11. The method as recited in claim 10, wherein the electronic device remains in a stationary position as the antenna positioner moves from the designated first position to the designated second position.

12. The method as recited in claim 10, wherein the antenna is further configured to transmit 5G cellular signals, and the electronic device is configured to receive 5G cellular signals.

13. The method as recited in claim 10, wherein the initializing the antenna positioner, the initializing the transmission characteristics, and the moving the antenna positioner are performed at a single controller device.

14. The method as recited in claim 10, further comprising introducing an obstacle between the antenna and the electronic device, wherein the measuring further comprises measuring how the obstacle affects the reception of the radio waves by the electronic device.

15. One or more non-transitory computer-readable storage media having computer-executable instructions stored thereon that, when executed by a computer, perform the following operations:
   initializing transmission characteristics of one or more transmitter antennae;
   designating a first position relative to a receiver device;
   initializing an antenna positioner that supports the one or more antennae at the designated first position, the antenna being configured to transmit radio waves in a particular direction;
   designating a second position relative to the receiver device;
   causing the antenna positioner to be moved to the designated second position; and
   measuring a reception level of the radio waves by the receiver device as the antenna positioner moves from the designated first position to the designated second position.

16. The one or more non-transitory computer-readable storage media as recited in claim 15, wherein the receiver device remains stationary during the measuring a reception level of the radio waves.

17. The one or more non-transitory computer-readable storage media as recited in claim 15, further comprising additional computer-executable instructions that, when executed by a computer, perform an additional operation of causing a user equipment cradle that holds the receiver device in a prescribed manner during the measuring a reception level of the radio waves.

18. The one or more non-transitory computer-readable storage media as recited in claim 15, wherein the initializing the transmission characteristics, the initializing the antenna positioner, and the causing the antenna positioner to be moved are performed at a single controller device.

19. The one or more non-transitory computer-readable storage media as recited in claim 18, wherein the measuring the reception level is performed at the controller device.

20. The one or more non-transitory computer-readable storage media as recited in claim 15, wherein the radio waves are 5G cellular radio waves having a wave frequency of between 600 MHz and 100 GHz.

\* \* \* \* \*